United States Patent
Loppoli

[11] Patent Number: 6,000,649
[45] Date of Patent: Dec. 14, 1999

[54] SCREW FEEDERS WITH PERFECTED PROFILE FOR CUTTER-MIXER-FEEDER WAGON FOR FODDER AND GRASS OR STRAW SILAGE

[75] Inventor: Giuseppe Loppoli, Grantorto, Italy

[73] Assignee: Seko SpA, Curtarola, Italy

[21] Appl. No.: 09/068,677

[22] PCT Filed: Mar. 6, 1996

[86] PCT No.: PCT/EP96/00934

§ 371 Date: Jun. 16, 1998

§ 102(e) Date: Jun. 16, 1998

[87] PCT Pub. No.: WO97/17840

PCT Pub. Date: May 22, 1997

[30] Foreign Application Priority Data

Nov. 14, 1995 [IT] Italy ................................ VI95A0179

[51] Int. Cl.⁶ .................................................. B02C 19/22
[52] U.S. Cl. ........................ 241/260.1; 241/261; 241/605
[58] Field of Search ................................ 241/260.1, 261, 241/97, 100, 605, 101.76

[56] References Cited

U.S. PATENT DOCUMENTS

| | | | |
|---|---|---|---|
| 4,767,067 | 8/1988 | Bruer et al. ................................ | 241/81 |
| 4,951,883 | 8/1990 | Loppoli et al. .................. | 241/101.762 |
| 5,199,638 | 4/1993 | Fischer ........................................ | 239/7 |
| 5,356,054 | 10/1994 | Loppoli et al. .......................... | 222/610 |
| 5,395,286 | 3/1995 | Sgariboldi .................................. | 460/23 |
| 5,433,577 | 7/1995 | Roycraft .................................. | 414/412 |
| 5,439,182 | 8/1995 | Sgariboldi ............................ | 241/260.1 |
| 5,443,588 | 8/1995 | Loppoli .................................... | 414/526 |
| 5,622,323 | 4/1997 | Krueger et al. ..................... | 241/101.76 |
| 5,820,043 | 10/1998 | Loppoli .............................. | 241/101.76 |

FOREIGN PATENT DOCUMENTS

| | | |
|---|---|---|
| 0352670 A2 | 1/1990 | European Pat. Off. . |
| 0385353 A3 | 9/1990 | European Pat. Off. . |
| 0699388 A2 | 3/1996 | European Pat. Off. . |
| 4239632 A1 | 6/1994 | Germany . |

*Primary Examiner*—John M. Husar
*Attorney, Agent, or Firm*—Watson Cole Grindle Watson P.L.L.C.

[57] ABSTRACT

The invention is a cutter-mixer-feeder wagon for fodder and grass or straw silage, comprising at least two rotary screw feeders (7), housed inside a compartment (75) with curved section obtained on the bottom (76) of the container (2) itself, each one provided with at least one pair of spirals (9, 10), on which peripheral cutters (13) are fixed, one of said spirals being wound clockwise (10) and the other anticlockwise (9), starting from the ends of the screw feeder and such as to convey the processed material towards the area where said right and left spirals converge. Each one of said spirals (9, 10) is provided, on its end facing the other spiral, with two or more discharge openings obtained on its profile (91, 92, 93; 101, 102, 103), each one of said openings being carried out by removing a portion of the spiral, where each discharge opening is formed by a substantially radial segment and by an arc-shaped part that are substantially orthogonal to each other, while said right and left spirals are interrupted at about 180° from each other, until they touch an ideal plane that intersects the longitudinal axis of the screw feeders.

7 Claims, 4 Drawing Sheets

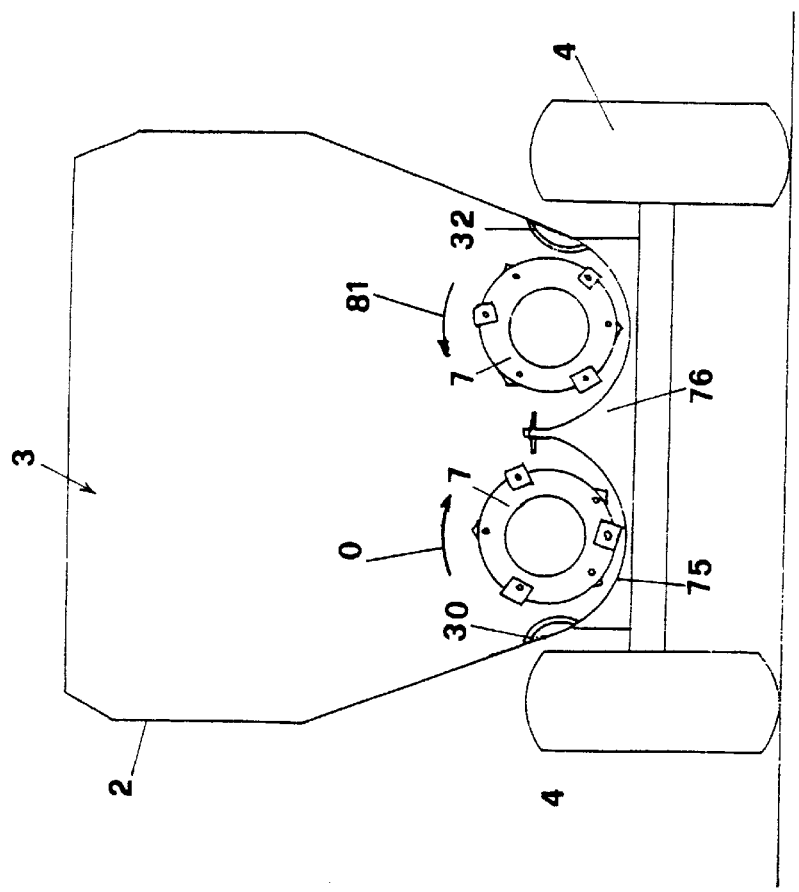
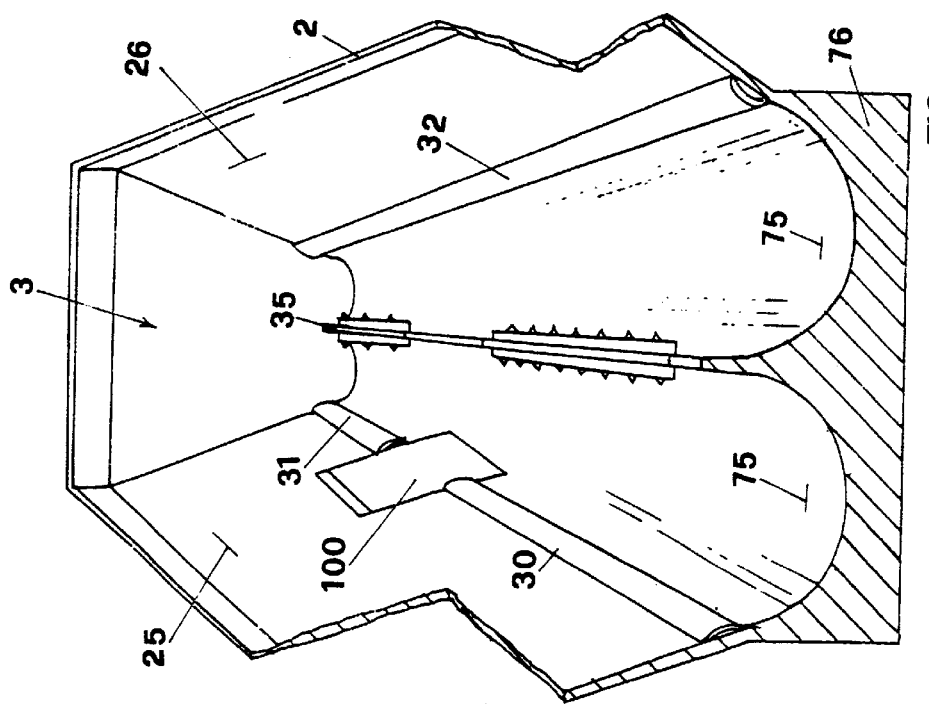

SCREW FEEDERS WITH PERFECTED PROFILE FOR CUTTER-MIXER-FEEDER WAGON FOR FODDER AND GRASS OR STRAW SILAGE

The invention concerns the screw feeders for wagons that are particularly suitable for cutting and mixing long-fibre products, such as fodder or grass or straw silage, made up in bales or in their natural state.

The wagons of the known kind are generally made up of a container inside which there are one or more rotary screw feeders that are positioned in the lower part of the container, but can also be positioned in its upper part.

Said wagons of the known kind are particularly suitable for cutting and mixing short-fibre products and have great difficulty cutting long-fibre products such as fodder or grass or straw silage, especially if the quantities involved are considerable.

In fact, during the cutting and mixing of long-fibre products the screw feeders tend to clog up, since the material gets entangled around them and hinders or even stops their rotation.

It is clear that in such conditions the screw feeders absorb much more power than in the optimal cutting conditions, that is, when they are not clogged up.

It is in order to eliminate the drawbacks described above that the the perfected cutter-mixer-feeder wagon object of the Italian patent application N. VI91A/108 corresponding to the International application N. PCT/EP 91/02510 has been carried out; said invention is provided with two rotary screw feeders with opposing spirals, positioned on the bottom of the wagon, and in the area where said spirals converge each of them is equipped with a diaphgram that is orthogonal to the longitudinal axis of the screw feeder itself and consists of two truncated cone-shaped surfaces united in correspondence with their greater base and converging towards the ends of each screw feeder.

The Italian patent application N. VI93A/028 corresponding to the European Patent N. 0612465 presented by the same inventor concerns a screw feeder with opposing spirals that converge on a discoidal element, half of which is formed by a right semispiral and the other half of which by a left semispiral. Each semispiral is provided with a discharge opening to facilitate the unloading of the material.

SUMMARY OF THE INVENTION

The screw feeders carried out according to the patent applications described above considerably improve the cutting and mixing of the product, but they are not the best solution to avoid the clogging of the product to be processed inside the wagon, yet.

Further, they do not ensure a sufficiently regular cutting of the product with constant power absorption.

It is to further improve the performance level in cutting, mixing and feeding the product that the wagon provided with screw feeders with perfected profile has been implemented; the main aim of this invention is to facilitate the mixing of the product that is being cut inside the wagon, in such a way as to obtain an homogeneous product as regards both quality and size.

A further goal is to improve the cutting of the product and to unload the product after it has been processed without leaving any residue inside the wagon.

Another aim is to accomplish a homogeneous rotation of the screw feeders with reduced absorption of power in comparison with the screw feeders mounted on wagons having the same capacity.

The aims described above have been achieved through the implementation of a cutter-mixer-feeder wagon for fodder and grass or straw silage, which, according to the main claim, comprises:

a container provided with at least one opening for the introduction of the material to be processed and with at least one door for the unloading of the processed material;

at least two rotary screw feeders, positioned inside a compartment with curved section obtained on the bottom of the container itself and parallel to each other, provided with at least one pair of spirals on which peripheral cutters are fixed, one of said spirals being wound clockwise and the other anticlockwise, starting from the ends of the screw feeder and such as to convey the processed material near the unloading door of the wagon;

counterblades positioned along said compartment and co-operating with said spirals of said screw feeders, said wagon being characterized in that each one of said spirals belonging to each screw feeder is provided, on its end facing the other spiral and limited to the zone in front of said opening where this counterblades are interrupted, with two or more discharge openings obtained on its profile, each one of said discharge openings is achieved by removing a portion of the spiral and being formed by a radial segment and by an arc-shaped part substantially orthogonal to each other, while each discharge opening on each individual screw feeder is displaced at about 180° from the next discharge opening.

According to a favourite application of the invention in question and in order to optimize the performance of the screw feeder object of the invention, each screw feeder interacts with two groups of counterblades positioned along the central line that separates the two compartments with curved section in which the screw feeders are housed. Further, said screw feeders rotate in opposite directions, in such a way as to convey the material that is being processed along the central longitudinal axis of the machine. Each group of counterblades is spaced both in correspondence with the part facing the vertical walls of the wagon and with the central part toward the unloading door, where there are the discharge openings obtained on the profile of the screw feeders. In this way, the pressure of the material against the vertical walls of the wagon decreases, and therefore the power necessary to make the screw feeders rotate decreases, too. Further, in the central part of the screw feeder and in correspondence with the unloading door, where there are also the discharge openings obtained on the screw feeder profile, the material can move freely upwards and mix in the best way, without being constrained on a fixed course by the rotary screw feeder, since said area of the screw feeder itself is not provided with counterblades.

To advantage, the two screw feeders optimize the cutting of the material with the counterblades, if the pitches of the coils are aligned so that counterblades and cutters work on one or the other side of each screw feeder at the same time, on a cutting plane that can be considered substantially perpendicular to the longitudinal axis of the machine. In this case, in fact, the thrust of the blade of one screw feeder against the counterblade while it is cutting the material tends to move the counterblade itself away, thus limiting the effectiveness of said counterblade. In the case of aligned pitches the same thrust, with opposite direction, is exerted on the same area of the counterblade by the cutter of the adjacent screw feeder and therefore said thrusts annul each other, thus ensuring, as already explained, the maximum cutting performance.

According to another embodiment, beside having the screw feeders object of the invention and the counterblades arranged as described above, the wagon can be provided with a profiled conveying plate positioned on each longitudinal wall of the wagon and near the screw feeder compartments, in such a way as to reduce the space between the screw feeder and the wall. In this way, the material is forced to move more quickly along the side walls, towards the centre. The cutting and mixing process inside the wagon is thus accelerated.

DESCRIPTION OF THE DRAWINGS

Further characteristics and details of the invention will be better highlighted in the description of a practical application among many of the wagon object of the invention, illustrated in the attached drawings, wherein:

FIG. 5 shows the inside of the wagon provided with the screw feeders object of the invention with a particular profiled plate positioned longitudinally near the screw feeders;

FIG. 6 shows a section of the wagon represented in FIG. 5.

DESCRIPTION OF THE INVENTION

Figure 1:
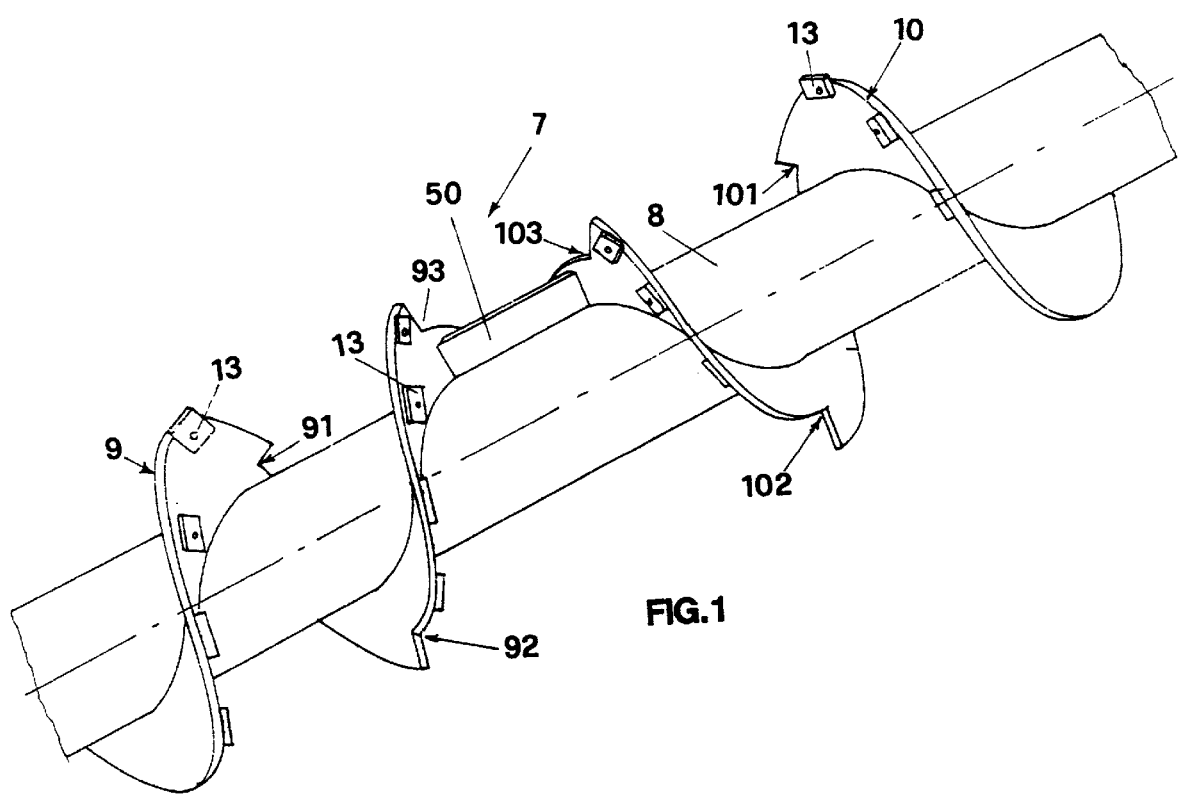
FIG. 1 is a view of the screw feeder object of the invention.
Figure 2:
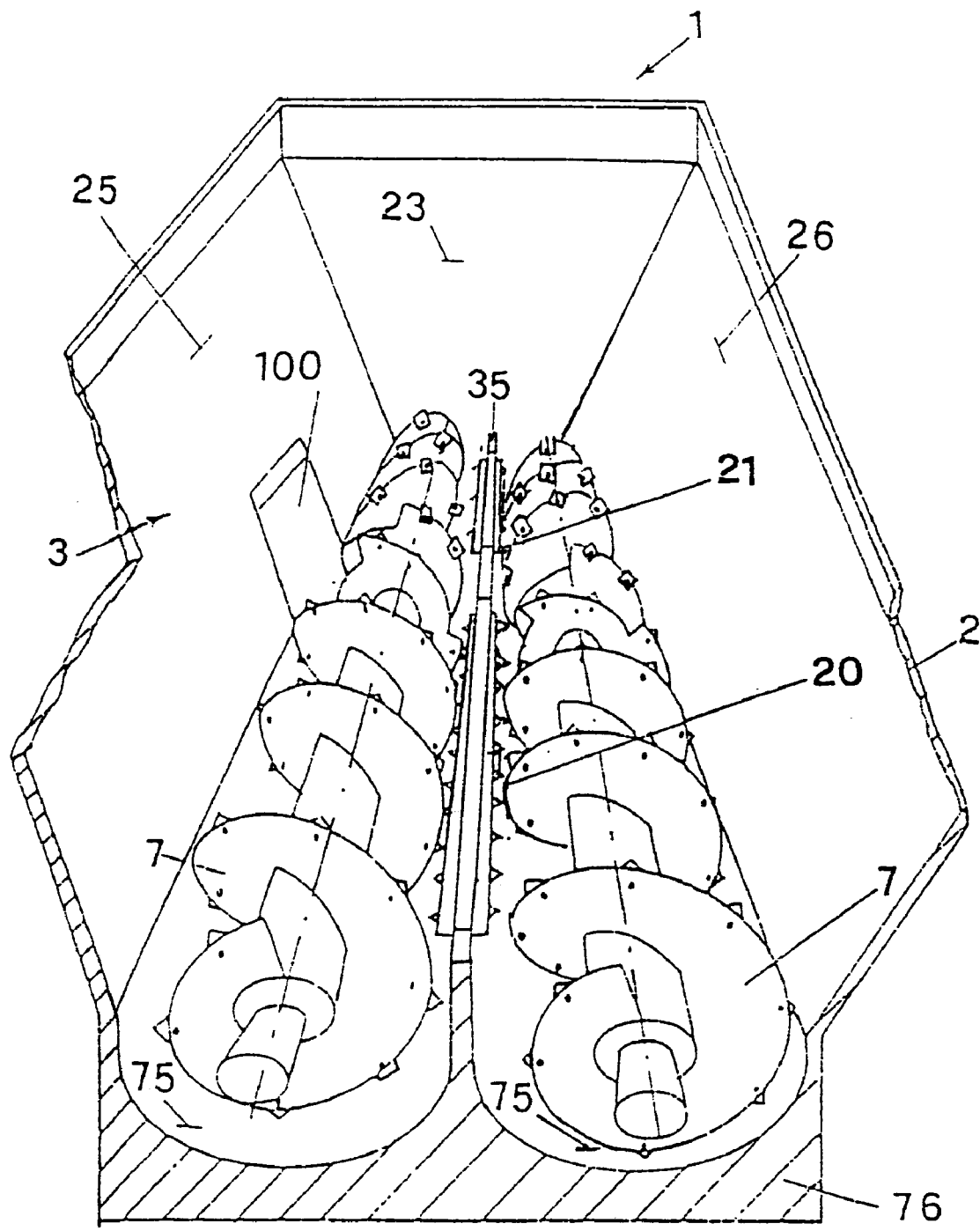
FIG. 2 is an axonometric view of the inside of a wagon provided with the screw feeders object of the invention.

With reference to the mentioned drawings, the wagon provided with the screw feeders object of the invention is indicated as a whole by 1, and comprises a container 2, mounted on wheels 4, which in its upper part is provided with a loading door 3 for the material to be processed. The container 2 is preferably made of sheet and in correspondence with its bottom it is provided with a pair of screw feeders 7, each one of which, as shown in FIG. 1, is formed by a central tubular core 8 on which two opposing spirals 9 and 10, one right and one left, are wound. Each screw feeder is housed inside a compartment 75 with curved section, obtained on the bottom 76 of the container 2.

The spiral 9 is wound anticlockwise, while the spiral 10 is wound clockwise, so that, starting from the two ends of the central core 8, they converge on the part of the screw feeder facing the unloading door.

Further, the edge of said spirals 9 and 10 is provided with a plurality of cutters 13 that are fixed protruding from the edge itself.

In each screw feeder 7, as shown in FIG. 1, the area where the two left and right spirals 9 and 10 converge corresponds to the unloading area. The left and right spirals, 9 and 10 respectively, are interrupted at about 180° from each other, until they touch an ideal plane that intersects the longitudinal axis of the screw feeders in a substantially perpendicular way. The left spiral 9, in correspondence with its last coil, is provided with three discharge openings obtained on its profile and indicated by 91, 92 and 93, respectively. Analogously, always in correspondence with the last coil, the right spiral 10 is provided with three discharge openings obtained on its profile and indicated by 101, 102 and 103, respectively. On each of the two right and left spirals the three discharge openings are spaced at 120° from one another. Each discharge opening is formed by a radial segment and by an arc-shaped part that intersect in a substantially orthogonal direction.

Figure 4:
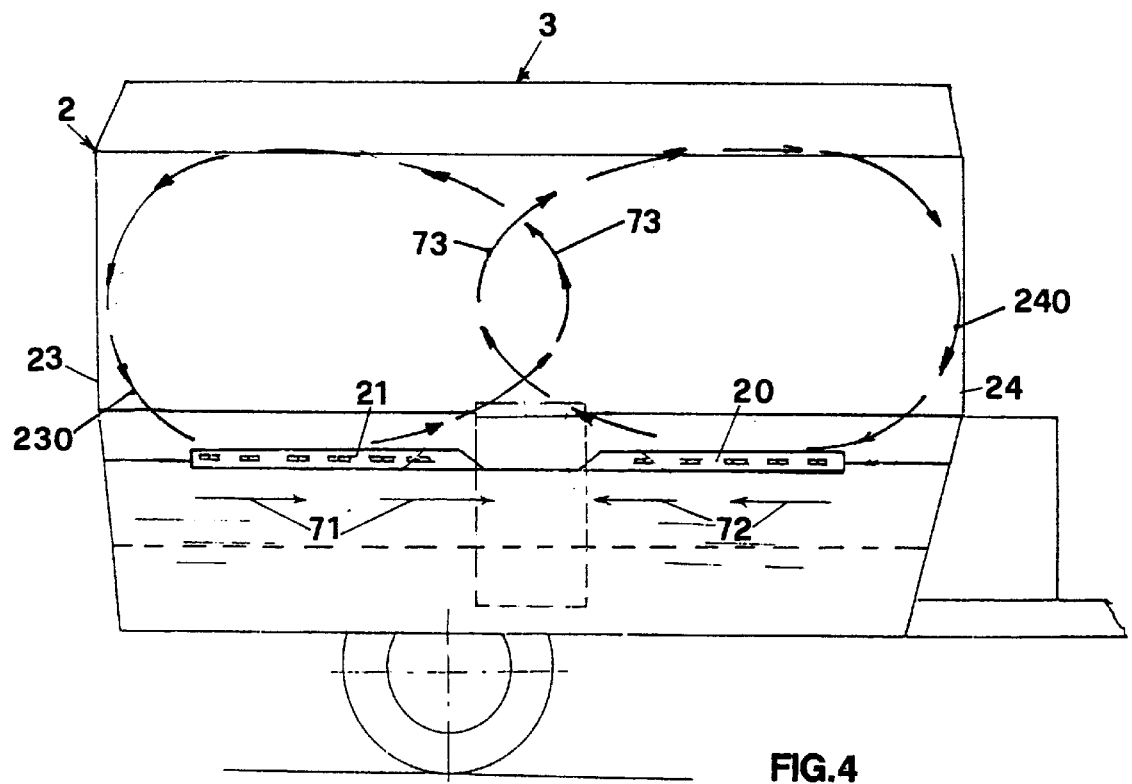
FIG. 4 is a side view of the distribution of the groups of counterblades shown in FIG. 3.

FIG. 1 shows that, in correspondence with the area where the spirals 9 and 10 converge, driving blades 50 are provided, in order to facilitate the movement of the product towards the upper part of the wagon, in the direction indicated by the arrow 73 in FIG. 4. Further, said blades also improve the unloading of the processed material through the unloading door 100.

Figure 3:
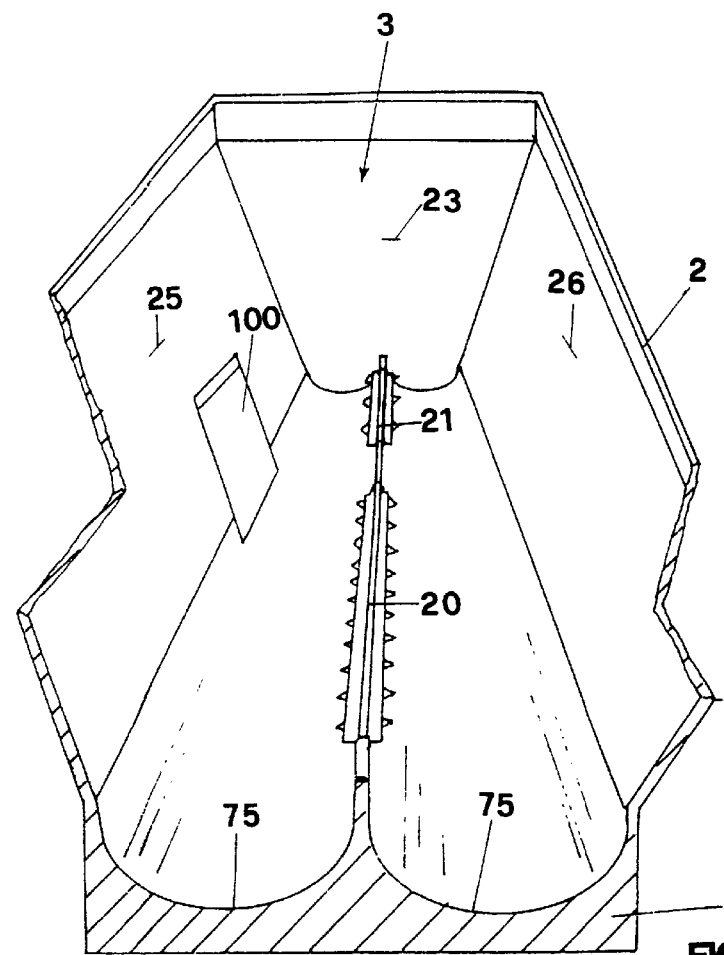
FIG. 3 is an axonometric view of the inside of the wagon provided with the screw feeders object of the invention with a particular configuration of the central counterblades.

According to a favourite embodiment of the wagon object of the invention, as shown in FIGS. 3 and 4, the two groups of counterblades 20 and 21 are positioned inside the wagon, along the line 35 that separates the compartments in which the screw feeders are housed. Each group of counterblades is spaced from the vertical walls of the wagon, 23 and 24 respectively. Further, said counterblades 20 and 21 stop near the discharge openings provided on the profile of the screw feeders. Obviously, where the counterblades are not provided, the part of the screw feeder provided with discharge openings does not interact with said counterblades. In this way, the material to be cut and mixed that previously moved among the screw feeder coils converging according to the direction indicated by the arrows 71 and 72 in FIG. 4 in this case can move without being constrained. FIG. 4 also shows that, owing to the presence of the discharge openings on the last coil of each spiral belonging to the screw feeder and to the absence of the counterblades, the material is naturally pushed upwards, in the direction indicated by the arrows 73. The material then falls down in correspondence with the walls 23 and 24 of the wagon, according to the direction 230, 240, indicated in FIG. 4.

The effective cutting of the material is obtained through the rotation of the screw feeders 7 in opposite directions, as indicated by the arrows 80 and 81 in FIG. 6, combined with the fact that the pitches of the screw feeder coils are the same, with aligned profiles, so that the counterblades and the cutters 13 of the screw feeders interact on a plane that is substantially perpendicular to the longitudinal axis of the wagon. The rotation of the screw feeders 7 is such as to convey the material to be processed in correspondence of the longitudinal axis the wagon.

According to a further application of the invention, the effective cutting and mixing process inside the wagon provided with the screw feeders object of the invention can be obtained by equipping the wagon with groups of counterblades interrupted, as already explained, in correspondence with the unloading area and in correspondence with the vertical walls of the wagon, owing also to the presence of profiled conveying plates, as shown in FIGS. 5 and 6. More precisely, said figures show that the inside container 2 of the wagon, in correspondence with its longitudinal walls and near the compartments where the screw feeders are housed, is provided with profiled conveying plates that are naturally divided on the unloading door side 100 and are indicated by 30 and 31, while on the other side there is a single, continuous profiled conveying plate 32. As it can be better observed in FIG. 6, the profiled conveying plates close the space between each screw feeder 7 and the side walls of the wagon 25 and 26, respectively, so that the material to be processed is forcedly conveyed along the course indicated by the arrows 71 and 72 in FIG. 4.

Beside the forced conveyance of the material in the direction indicated by the arrows 71 and 72, it has also been possible to observe a quickening of the transfer of material, so that all the cutting and mixing process inside the wagon is improved as regards both quickness and quality.

I claim:

1. A cutter-mixer-feeder wagon for fodder and grass or straw silage to be processed, comprising:

a container having at least one opening for the introduction of the material to be processed and at least one door for unloading the processed material;

a compartment having a curved sections formed in a bottom of the container;

at least two rotary screw feeders each having a longitudinal axis, one each located in the curved section, each feeder having at least one pair of converging spirals and peripheral cutters fixed to the spirals, one of said spirals of each pair being wound clockwise and the other of the pair anticlockwise about the longitudinal axis, starting from ends of the screw feeder so as to convey the processed material towards the area where the right and left spirals converge;

counterblades positioned along said compartment and cooperating with said spirals, each of said spirals having a profile with a plurality of discharge openings formed therein on its ends facing the other spiral and limited to a zone in front of said opening where the counterblades converge, each discharge opening being achieved by removing a portion of the spiral and being formed by a substantially radial segment and by an arc-shaped segment that are substantially orthogonal to each other, said right and left spirals being interrupted and displace from each other by about 180° such that they engage a plane including the longitudinal axis of the screw feeder.

2. A wagon according to claim 1, wherein the discharge openings on each spiral are formed on a last coil of each spiral and develop on an angle having a maximum amplitude of 360°.

3. A wagon according to claim 1, wherein the end of each spiral facing the other spiral has at least one driving blade comprising a blade fixed to the screw feeder and arranged in a longitudinal direction substantially parallel to the screw feeder.

4. A wagon according to claim 1, wherein said screw feeders rotate in opposite directions so as to convey the material to be processed along the longitudinal axis of the wagon.

5. A wagon according to claim 1, including two groups of counterblades, each group being positioned along a line separating the compartments in which the screw feeders are housed and being formed by cutting edges interacting with the cutters on the screw feeders on one side and of the other screw feeder on the other side, each group of counterblades being spaced with respect to walls of the wagon on one side and being interrupted near a beginning of the discharge openings formed on the profile of the screw feeders on the other side.

6. A wagon according to claim 5, wherein the screw feeders have coils with the same pitch and with aligned profiles, so that the counterblades and the cutters of each screw feeder interact on a plane that is substantially perpendicular to a longitudinal axis of the wagon.

7. A wagon according to claim 1, including profiled conveying plates positioned on longitudinal walls of the wagon, near the compartments, and shaped so as to reduce the space between the screw feeder and the longitudinal wall of the wagon for the transfer of the material to be processed.

* * * * *